United States Patent [19]
Robinson

[11] Patent Number: 5,968,187
[45] Date of Patent: Oct. 19, 1999

[54] COMPUTER SYSTEM AND METHOD INCLUDING A PORTABLE PORTION THAT HAS A CAPABILITY TO DIAGNOSE AND PERFORM ANALYSIS FOR A STATIONARY POSITION AND FOR A PORTABLE PORTION

[75] Inventor: Michael G. Robinson, Kettering, Ohio

[73] Assignee: NCR Corporation, Dayton, Ohio

[*] Notice: This patent is subject to a terminal disclaimer.

[21] Appl. No.: 08/841,094

[22] Filed: Apr. 28, 1997

Related U.S. Application Data

[63] Continuation of application No. 08/513,109, Aug. 9, 1995, abandoned.

[51] Int. Cl.⁶ .................................................. G06F 11/00
[52] U.S. Cl. .............................. 714/25; 714/46; 370/241
[58] Field of Search ........................ 395/183.01, 183.05, 395/183.06, 183.07, 183.13, 183.14, 183.22; 364/231, 231.1, 231.2, 231.31; 714/29, 25, 30, 31, 46

[56] References Cited

U.S. PATENT DOCUMENTS

| 4,882,674 | 11/1989 | Quint et al. | 364/200 |
|---|---|---|---|
| 5,159,533 | 10/1992 | Kuang | 361/391 |
| 5,206,946 | 4/1993 | Brunk | 395/500 |
| 5,257,393 | 10/1993 | Miller | 395/800 |
| 5,265,238 | 11/1993 | Canova, Jr. | 395/500 |
| 5,323,291 | 6/1994 | Boyle et al. | 361/683 |
| 5,377,357 | 12/1994 | Nishigaki | 395/800 |
| 5,386,567 | 1/1995 | Lien | 395/700 |
| 5,396,400 | 3/1995 | Register | 361/686 |
| 5,414,817 | 5/1995 | Ezzet | 395/275 |
| 5,526,493 | 6/1996 | Shu | 395/281 |
| 5,528,758 | 6/1996 | Yeh | 395/200.08 |
| 5,530,891 | 6/1996 | Gephardt | 395/800 |
| 5,535,336 | 7/1996 | Smith et al. | 395/200.06 |
| 5,535,338 | 7/1996 | Krause et al. | 395/200.2 |
| 5,551,748 | 9/1996 | Norris | 395/200.1 |
| 5,640,537 | 6/1997 | Jessen et al. | 395/500 |
| 5,666,530 | 9/1997 | Clark et al. | 395/617 |
| 5,668,977 | 9/1997 | Swanstrom et al. | 395/500 |
| 5,745,733 | 4/1998 | Robinson | 395/500 |

Primary Examiner—Dieu-Minh T. Le
Attorney, Agent, or Firm—Ying Tuo; Kenneth M. Berner

[57] ABSTRACT

Disclosed is a computer system and method in which a portable portion has the capability to diagnose and perform analysis for the stationary portion and for the portable portion. The computer system includes a portable computer having a network interface circuit coupled between the portable computer and a network. The network interface circuit includes a processor and a network address logic for identifying a network address associated with the portable computer. A stationary computer includes a network interface circuit coupled between the stationary computer and the network. The network interface circuit of the stationary computer sends an instruction set to the network interface circuit of the portable computer via the network based on the network address associated with the first computer. The processor on the network interface circuit of the portable computer executes the instruction set of performed diagnoses for the portable computer.

7 Claims, 11 Drawing Sheets

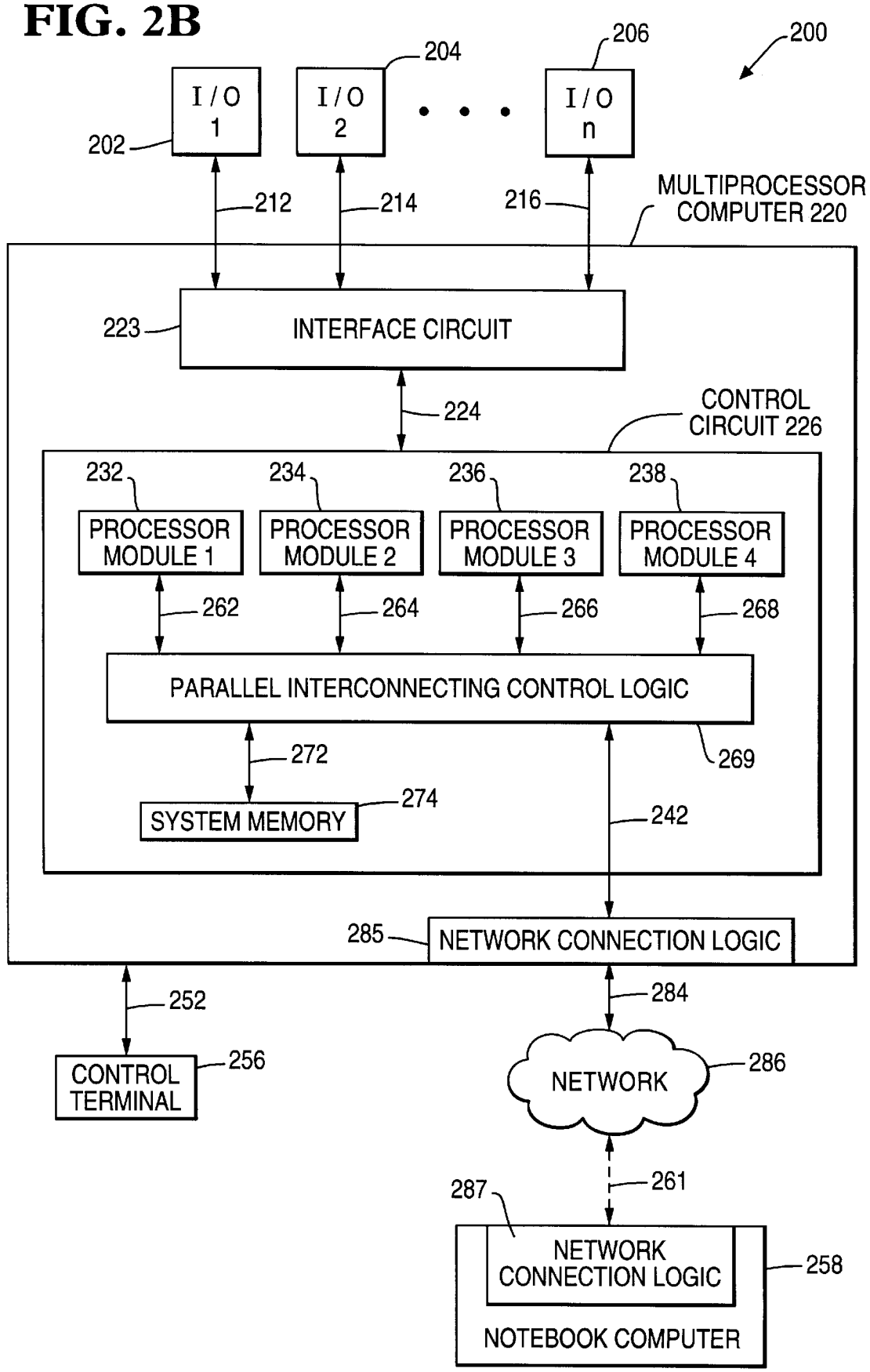

COMPUTER SYSTEM AND METHOD INCLUDING A PORTABLE PORTION THAT HAS A CAPABILITY TO DIAGNOSE AND PERFORM ANALYSIS FOR A STATIONARY POSITION AND FOR A PORTABLE PORTION

This is a continuation of application Ser. No. 08/513,109, filed on Aug. 9, 1995, now abandoned.

BACKGROUND OF THE INVENTION

The present invention relates to computer systems and, more particularly, to a computer system having a portable portion and a stationary portion.

To have both the portability and processing capability, a typical computer system may be divided into two portions, a portable portion and a stationary portion. Usually, the portable portion contains only a part of the hardware and software of the computer system, which are able to perform certain functions independently from the stationary portion.

The stationary portion contains the remaining part of the hardware and software of the computer system. Being connected together, the portable portion and stationary portion can perform the full functions desired by a specific user.

FIG. 1 depicts an exemplary computer system including stationary portion 100S, and portable portion 100P, which can be a notebook computer 136. Stationary portion 100S includes n input/output devices (I/O 1, I/O 2, . . . , I/O n) and docking station 108. The docking station includes interface circuit 113, and connection logic 132.

When notebook computer 136 is connected to stationary portion 100S via link 134, it can provide control signals to interface circuit 113 via connection logic 132. Thus, the notebook computer can control the operation of the docking station and input/output devices.

One disadvantage to the arrangement shown in FIG. 1 is that all peripherals connected to the stationary portion are unusable when the portable portion is removed from the computer system. The peripherals may represent substantial investments.

Another disadvantage to the arrangement shown in FIG. 1 is the processing capability of the computer system is limited by the capacity of the portable portion. For example, notebook computer 136 can be used to collect scientific or business data in a remote site from the stationary portion. When the notebook is connected to the stationary portion, docking station 108 does not provide additional processing power to the process the scientific or business data.

Still another disadvantage to the arrangement shown in FIG. 1 is that the connection of the portable portion is limited to the vicinity of the stationary portion.

With the development of computer systems, the structure and function of the stationary portion is becoming more and more complex.

Therefore, there is a need for a computer system whose stationary portion can independently run without the portable portion, and whose portable portion can both operate the stationary portion and perform diagnosis or performance analysis for the stationary portion.

SUMMARY OF THE INVENTION

In one aspect, this invention provides a novel computer system, including:

a stationary portion including at least one processor module; and a portable portion, including a portable processor module;

wherein said stationary processor modules operates said stationary portion in a parallel fashion when said portable processor is disconnected from said stationary portion;

wherein said stationary processor module and portable processor module are able to operate said stationary portion in a parallel fashion when said portable processor is coupled to said stationary portion;

wherein said portable processor module is able to perform diagnostics on said stationary portion when said portable processor is coupled to said stationary portion.

In another aspect, this invention provides a novel computer system, including:

a stationary portion;

a portable portion, connected to said stationary portion via a network, including a portable processor module; and a network connection interface, coupled to said stationary portion, including a processor unit;

wherein said portable portion sends testing parameters to said stationary portion via said network when said portable portion wants to conduct a test on said stationary portion;

wherein said processor unit executes said test for said portable portion.

One feature of this invention is the capability to facilitate the continued use of computer peripherals and a docking station when a portable computer is removed from the docking station.

Another feature of this invention is the capability to provide additional processing power to a portable computer when it is connected to a docking station.

Still another feature of this invention is the capability to provide a computer system whose portable portion can be remotely connected to the stationary portion.

Accordingly, the objective of this invention is to provide computer systems whose portable portion can conduct diagnosis or performance analysis for the stationary portion, while having all the above-mentioned features.

BRIEF DESCRIPTION OF THE DRAWING

The features and advantages of the present invention will become apparent to those skilled in the art to which the invention relates from the subsequent description of the preferred embodiments and the appended claims, in conjunction with the accompanying drawing in which:

FIG. 2B depicts a computer system, including a multi-processor computer and a portable computer, where said portable computer can be connected to the multiprocessor computer via a network, in accordance with another embodiment of the present invention;

DETAILED DESCRIPTION OF THE PREFERRED EMBODIMENTS

Figure 1:
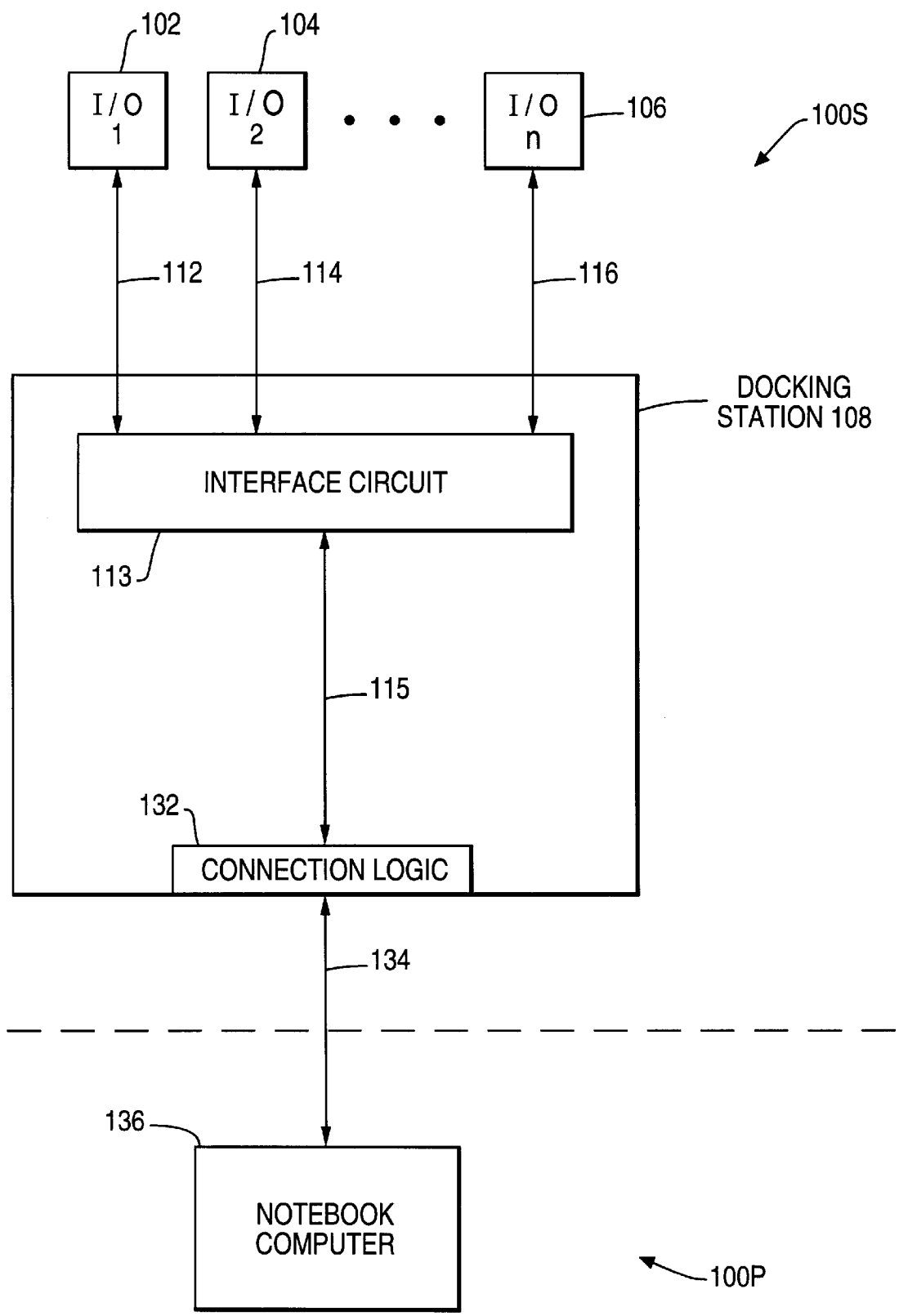
FIG. 1 depicts an exemplary conventional computer system, including a portable portion and a stationary portion.
Figure 2A:
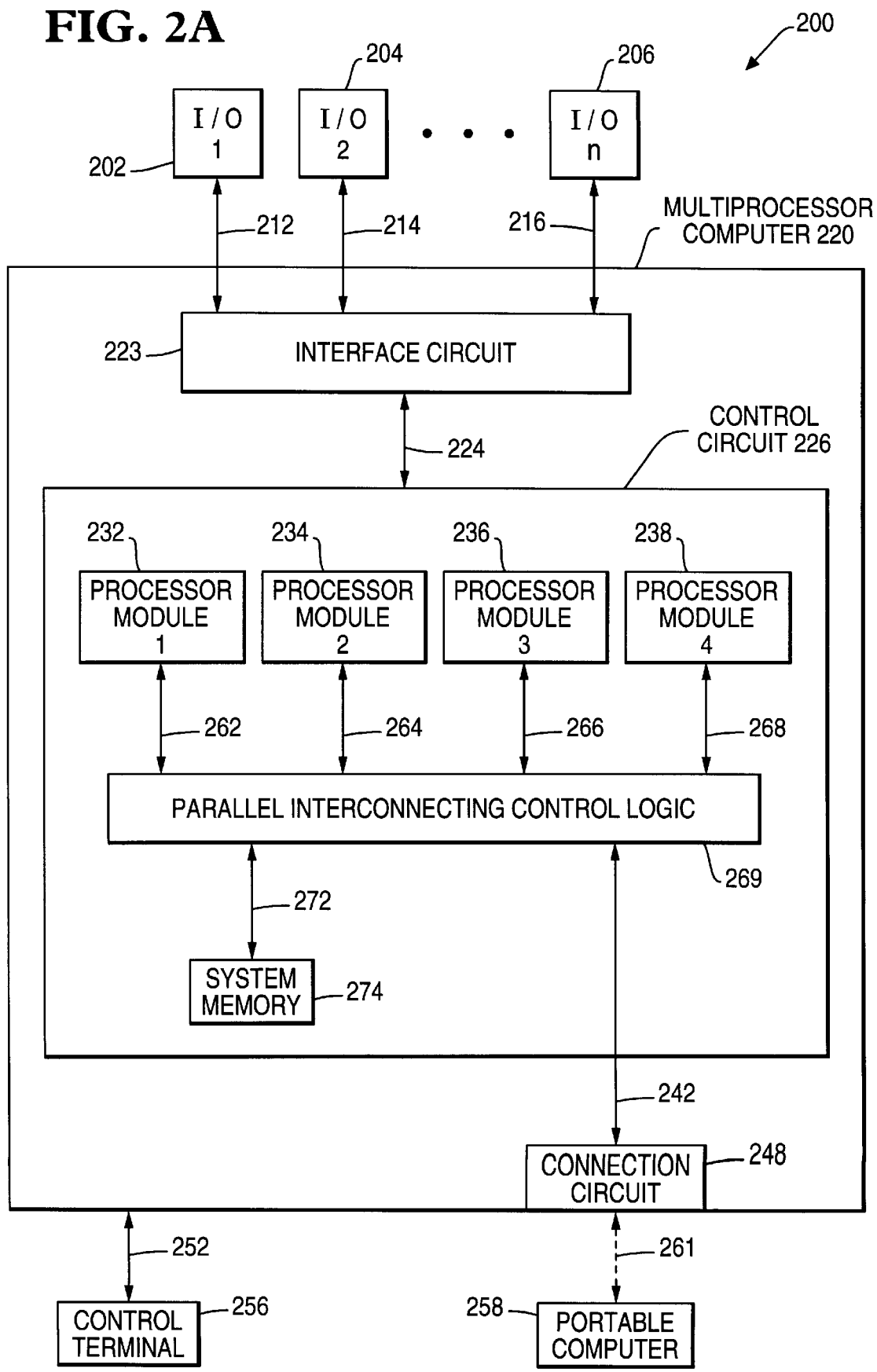
FIG. 2A depicts a computer system, including a multi-processor computer and a portable computer, in accordance with one embodiment of the present invention.

FIG. 2A depicts computer system 200 in accordance with one embodiment of the present invention. The computer system includes multiprocessor computer 220; control terminal 256, possibly including a CRT and a keyboard; portable computer 258; and input/output devices, including I/O 1 (202), I/O 2 (204), . . . , I/O n (206).

Multiprocessor computer 220 includes interface circuit 223, control circuit 226, and connection circuit 248.

Control circuit 226 includes four processor modules (232, 234, 236, 238), parallel interconnecting control logic 269, and system memory 274.

Each of the four processors may contain more than one processor.

I/O 1 (202), I/O 2 (204), . . . , I/O n (206) can be different types of input/output devices. For example, I/O 1 can be a color laser printer, I/O 2 can be a high capacity disk driver, and I/O n can be communication facilities.

Interface circuit 223 includes buffers, buses and circuits (not shown), which are necessary to operate the input/output devices.

Parallel interconnecting control logic 269 contains the memory for storing parallel management software. Under the control of the parallel interconnecting control logic and the parallel management software, the four processor modules operate in parallel fashion. Each of the four processors has access to system memory 274 via the parallel interconnecting control logic.

Portable computer 258 can be a notebook computer.

Input/output devices 202, 204, 206 are connected to interface circuit 223 via lines 212, 214, 216, respectively.

Interface circuit 223 is connected to control circuit 226 via line 224.

Within control circuit 226, the four processor modules (232, 234, 236, 238) are connected to parallel interconnecting control logic 269 via lines 262, 264, 266, 268, respectively. System memory 274 is connected to parallel interconnecting control logic 269 via line 272.

Connection circuit 248 is connected to parallel interconnecting control logic 269 via line 242.

Portable computer 258 is connected to connection circuit 248 via communication channel 261, which can be a metal cable, a fiber cable, or a wireless communication channel. Connection circuit 248 has the capability to receive data and control signals from the metal cable, fiber cable or wireless communication channel, and to deliver the data and control signals to parallel interconnecting control logic 269. Through line 242, the connection circuit also has the capability to pass data and control signals from parallel interconnecting control logic 269 to communication channel 261.

In operation, when portable computer 258 is connected to connection circuit 248, it acts as a processor module of multiprocessor computer 220. Under the control of the parallel interconnecting control logic and the parallel management software, processor modules 1–4 and portable computer 258 operate in parallel fashion. When portable computer 258 is removed from multiprocessor computer 220, processor modules can operate in parallel fashion without the portable computer.

It should be noted that the present invention shown in FIG. 2A can use all hardware and software resources to process the data collected by and stored in portable computer 258.

FIG. 2B depicts computer system 200 in accordance with another embodiment of the present invention. The elements and connections shown in FIGS. 2A and 2B are similar, except that in FIG. 2B portable computer 258 is connected to multiprocessor computer 220 via network 286 and network connection logic 287 is added into portable computer 258.

Figure 3A:
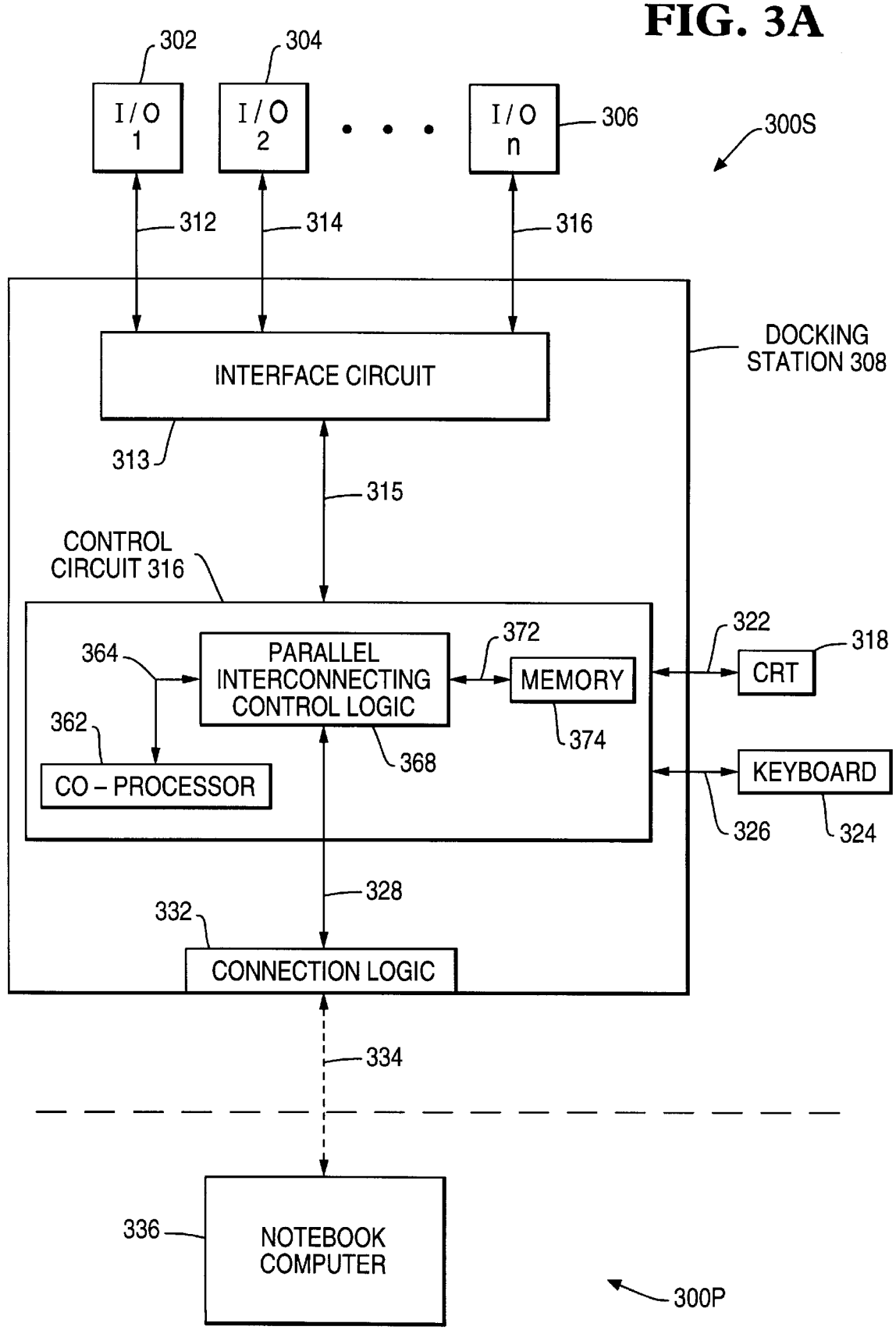
FIG. 3A depicts a computer system, including stationary portion 300S having a co-processor and a parallel interconnecting logic, and portable portion 300P, in accordance with another embodiment of the present invention.

FIG. 3A depicts a computer system including stationary portion 300S and portable portion 300P, in accordance with another embodiment of the present invention.

Portable portion 300P can be a notebook computer 336.

Stationary portion 300S includes input/output devices (I/O 1, I/O 2, . . . , I/O n) and docking station 308.

I/O 1, I/O 2, . . . , I/O n can be different types of input/output devices. For example, I/O 1 can be a color laser printer, I/O 2 a CD-ROM driver, and I/O n a color scanner.

Docking station 308 includes interface circuit 313, control circuit 316, and connection logic 332.

Control circuit 316 includes co-processor 362, parallel interconnecting control logic 368, and memory 374.

Input/output devices 302, 304, 306 are connected to interface circuit 313 via lines 312, 314, 316, respectively.

Within docking station 308, interface circuit 313 is connected to control circuit 316 via line 315, and connection logic 332 is connected to parallel interconnecting control logic via line 328.

Within control circuit 316, co-processor 362 and memory 374 are connected to parallel interconnecting control logic 368 via lines 364 and 372 respectively. The parallel interconnecting control logic contains parallel management software.

CRT display 318 and keyboard 324 are connected to control circuit 316 via lines 322 and 326 respectively. CRT display 318 and keyboard 324 serve as a secondary control terminal for the docking station, when notebook computer 336 is removed from stationary portion 300S. The CRT display and keyboard can also serve as the control terminal when the notebook computer is connected to the docking station.

Portable computer 300P is connected to connection logic 332 via communication channel 334, which can be a metal cable, a fiber cable, or a wireless communication channel. Connection logic 332 has the capability to receive data and control signals from the metal cable, fiber cable or wireless communication channel, and to deliver the data and control signals to control circuit 316. Through line 328, the connection circuit also has the capability to pass data and control signals to communication channel 334.

In operation, when the notebook computer is connected to connection circuit 332, co-processor 362 and notebook computer 336 operate in parallel fashion, under the control of parallel interconnecting control logic 368 and the parallel management software. When notebook computer 336 is removed from the connection circuit, co-processor 362 can operate docking station 308 and input/output devices independently.

Figure 3B:
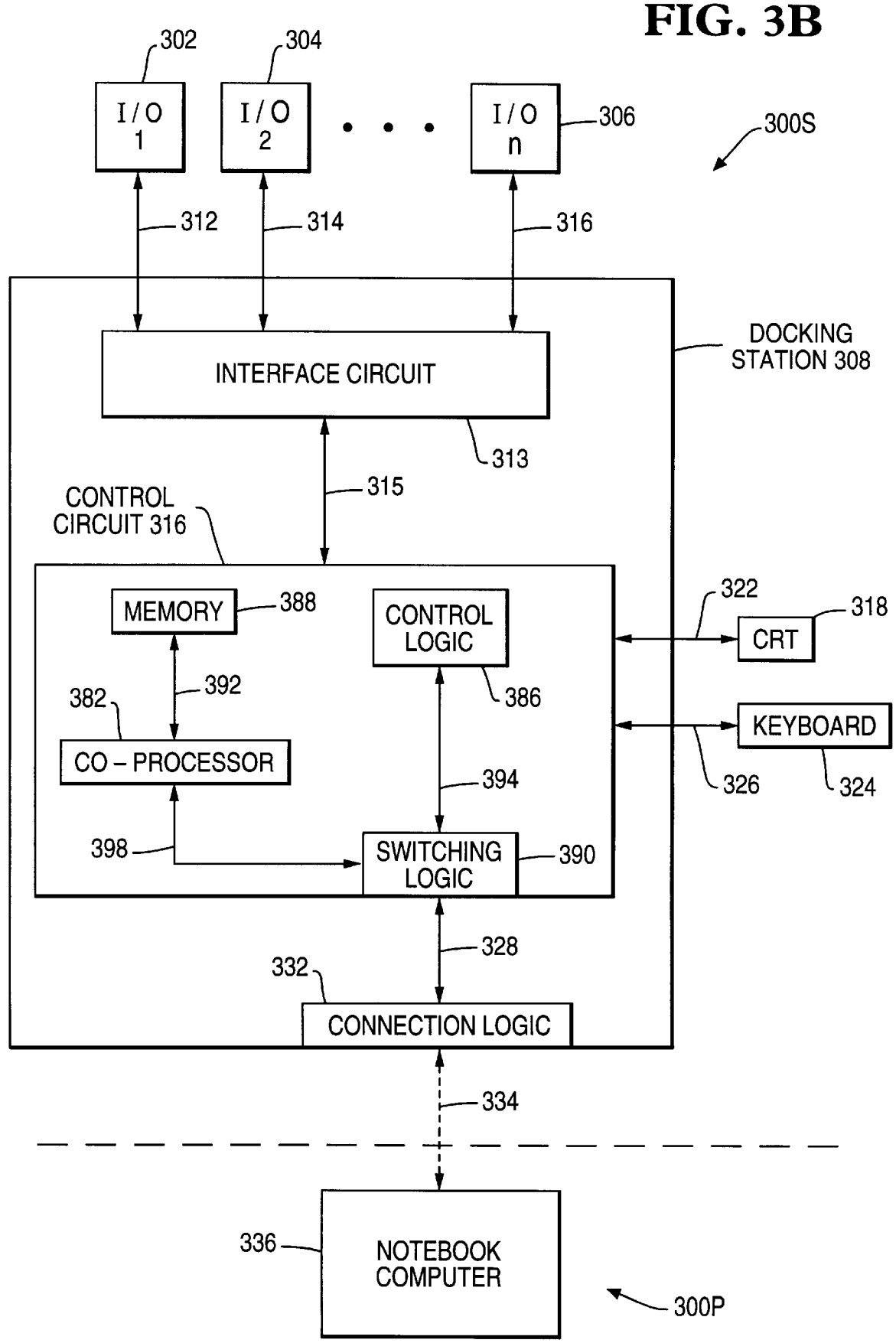
FIG. 3B depicts a computer system, including stationary portion 300S having a co-processor and a switching logic, and portable portion 300P, in accordance with another embodiment of the present invention.

FIG. 3B depicts a computer system including stationary portion 300S and portable portion 300P, in accordance with another embodiment of the present invention.

The elements and connections shown in FIGS. 3A and 3B are similar, except that the structures within control circuits 316 in the two embodiments are different.

In FIGS. 3A and 3B, the similar elements and connections use same labeling numerals. These similar elements and connections in FIG. 3B have been described in the embodiment shown in FIG. 3A, and thus they will not be further described in the embodiment shown in FIG. 3B.

Referring to FIG. 3B, control circuit 316 includes co-processor 382, control logic 386, memory 388 and switching logic 390.

Memory 388 is connected to co-processor 382 via line 392. Co-processor 382 and connection logic 332 are connected to switching logic 390 via lines 398 and 328, respectively. Switching logic 390 is connected to control logic 386 via line 394.

Co-processor 382 and notebook computer 336 are connected to control logic 386 under control of switching logic 390.

Control logic 386 can provide data and control signals received either from co-processor 382 or notebook computer 336 to interface circuit 313.

In operation, when notebook 336 is connected to connection logic 332 to operate docking station 308, switching logic 390 completely deactivates line 398, and activates lines 328. Therefore, notebook computer 336 controls the operation of the docking station 308 and input/output devices.

When notebook 336 is connected to connection logic 332 for the purpose of diagnosing or conducing the performance analysis of docking station 308, switching logic 390 relays control information and parameters from notebook computer 336 to co-processor 382. Co-processor 382 operates docking station 308 according to the control information and parameters. Control logic 386 provides the control signal from co-processor 382 to interface circuit 313. Switching logic 390 also delivers the diagnostic information and performance analysis information to notebook computer 336.

When notebook computer 336 is removed from docking station 308, switching logic 390 activates line 398, and deactivates line 328. Therefore, co-processor 382 controls the operation of the docking station 308 and input/output devices.

Figure 3C:
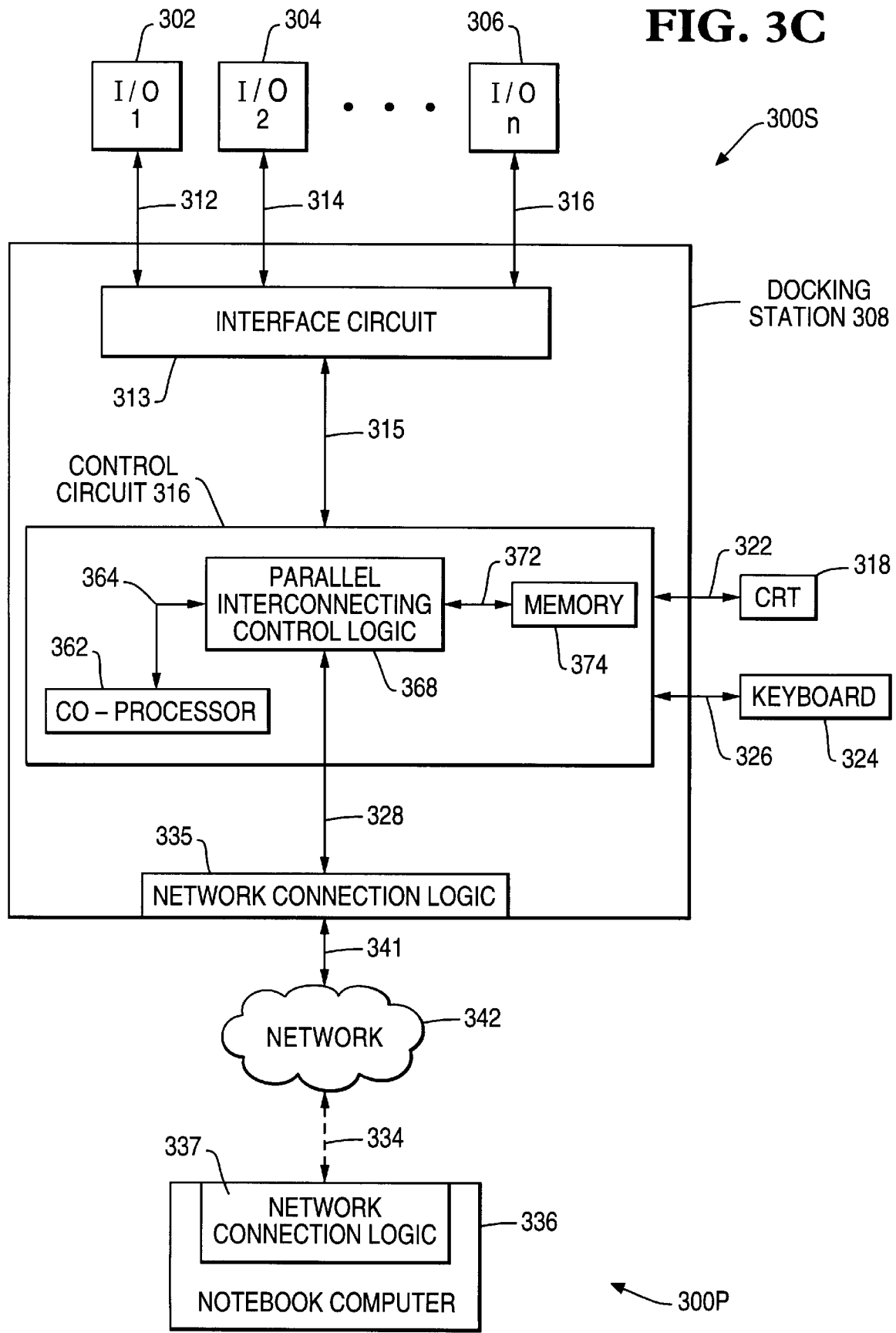
FIG. 3C depicts a computer system, including stationary portion 300S having a co-processor and a parallel interconnecting logic, and portable portion 300P, where the portable computer can be connected to the docking station via a network, in accordance with another embodiment of the present invention.

FIG. 3C depicts a computer system, including stationary portion 300S having co-processor 362 and parallel interconnecting logic 368, and portable portion 300P, where the portable portion can be connected to the stationary portion via network 342, in accordance with another embodiment of the present invention.

The elements and connections shown in FIGS. 3A and 3C are similar, except that: (1) connection logic 332 in FIG. 3A is replaced by network connection logic 335, which is connected to network 342 via link 341, (2) network connection logic 337 is added into notebook computer 336, and (3) through network connection logic 337, notebook computer 336 is connected to network 342 via communication channel 334.

In FIGS. 3A and 3C, the similar elements and connections use same labeling numerals. These similar elements and connections in FIG. 3C have been described in the embodiment shown in FIG. 3A, and thus they will not be further described in the embodiment shown in FIG. 3C.

Figure 3D:
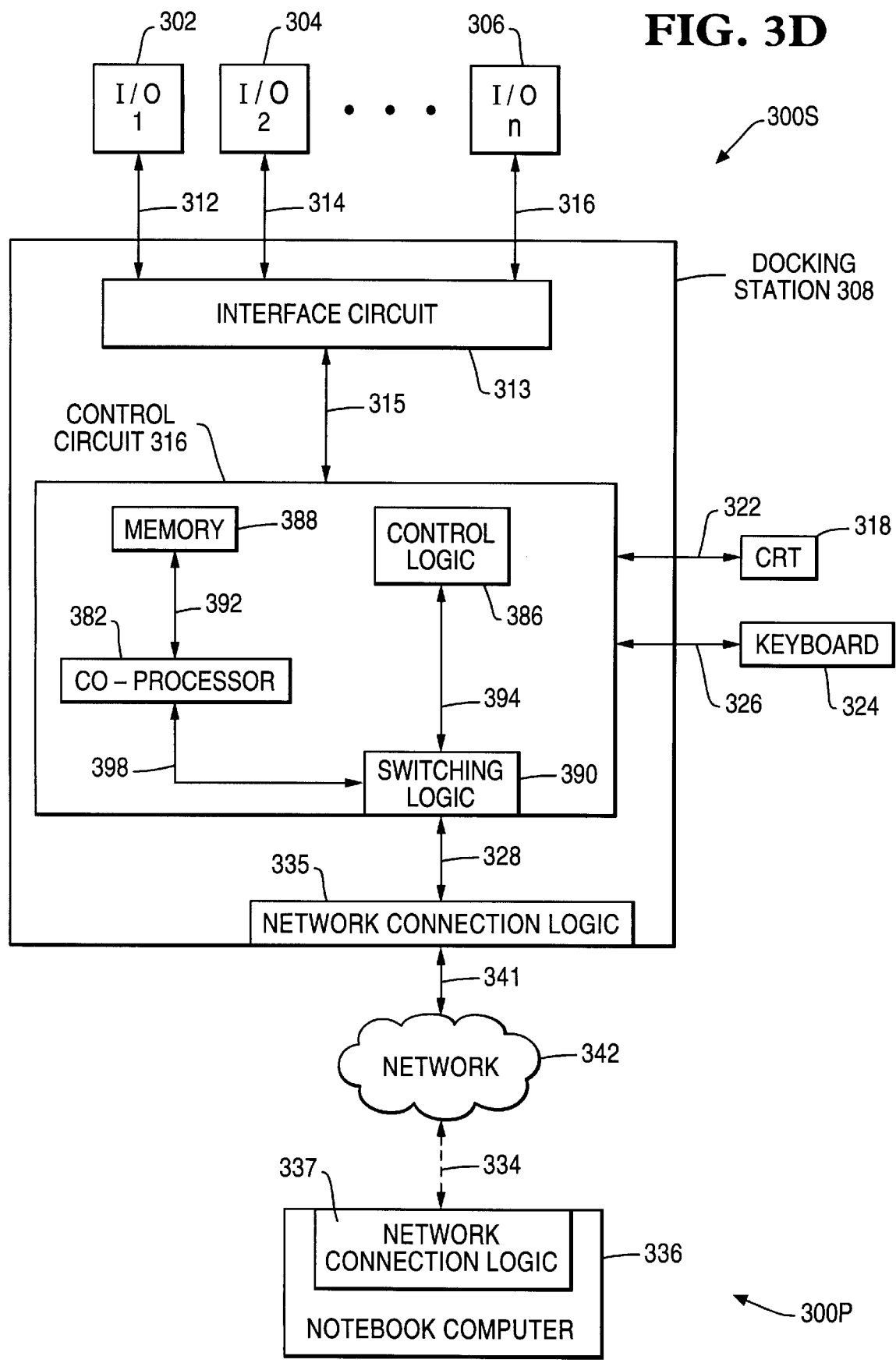
FIG. 3D depicts a computer system, including stationary portion 300S having a co-processor and a switching logic, and portable portion 300P, where the portable portion can be connected to the stationary via a network, in accordance with another embodiment of the present invention.

FIG. 3D depicts a computer system, including docking station 308 having co-processor 382 and switching logic 390, and portable computer 336, where the portable computer can be connected to the docking station via network 342, in accordance with another embodiment of the present invention.

The elements and connections shown in FIGS. 3B and 3D are similar, except that: (1) connection logic 332 in FIG. 3B is replaced by network connection logic 335, which is connected to network 342 via link 341, (2) network connection logic 337 is added into notebook computer 336, and (3) through network connection logic 337, notebook computer 336 is connected to network 342 via communication channel 334.

In FIGS. 3B and 3D, the similar elements and connections use same labeling numerals. These similar elements and connections in FIG. 3D have been described in the embodiment shown in FIG. 3B, and thus they will not be further described in the embodiment shown in FIG. 3D.

Figure 3E:
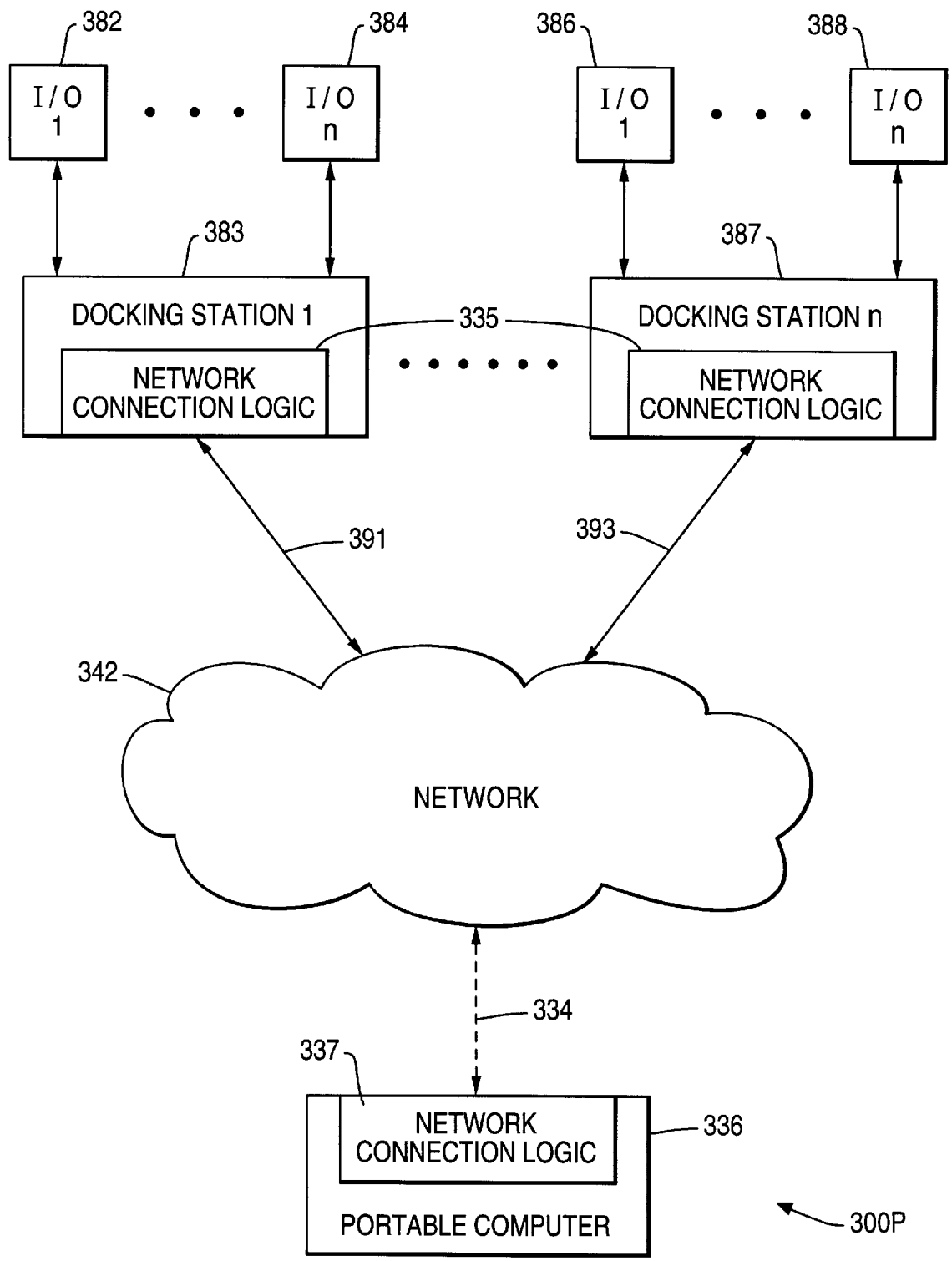
FIG. 3E depicts a configuration, including a plurality of stationary portions and a portable portion, where the portable portion can be connected to the plurality of stationary portions via a network, in accordance with another embodiment of the present invention.

FIG. 3E depicts a configuration, including a plurality of stationary portions (i.e. docking stations 1, . . . , n) and a portable computer 336, where the portable computer can be connected to any one of the plurality of stationary stations via network 342, in accordance with another embodiment of the present invention.

The docking stations can be the ones shown in FIG. 3C or 3D. Each of the docking stations has a plurality input/output devices (I/O 1, . . . , I/O n). Docking stations 1, . . . , n are connected to network 342 via links 391, . . . , 393 respectively.

Portable computer 336 is connected to network 342 via communication channel 334, which can be a metal cable, a fiber cable, or a wireless communication channel.

Figure 4:
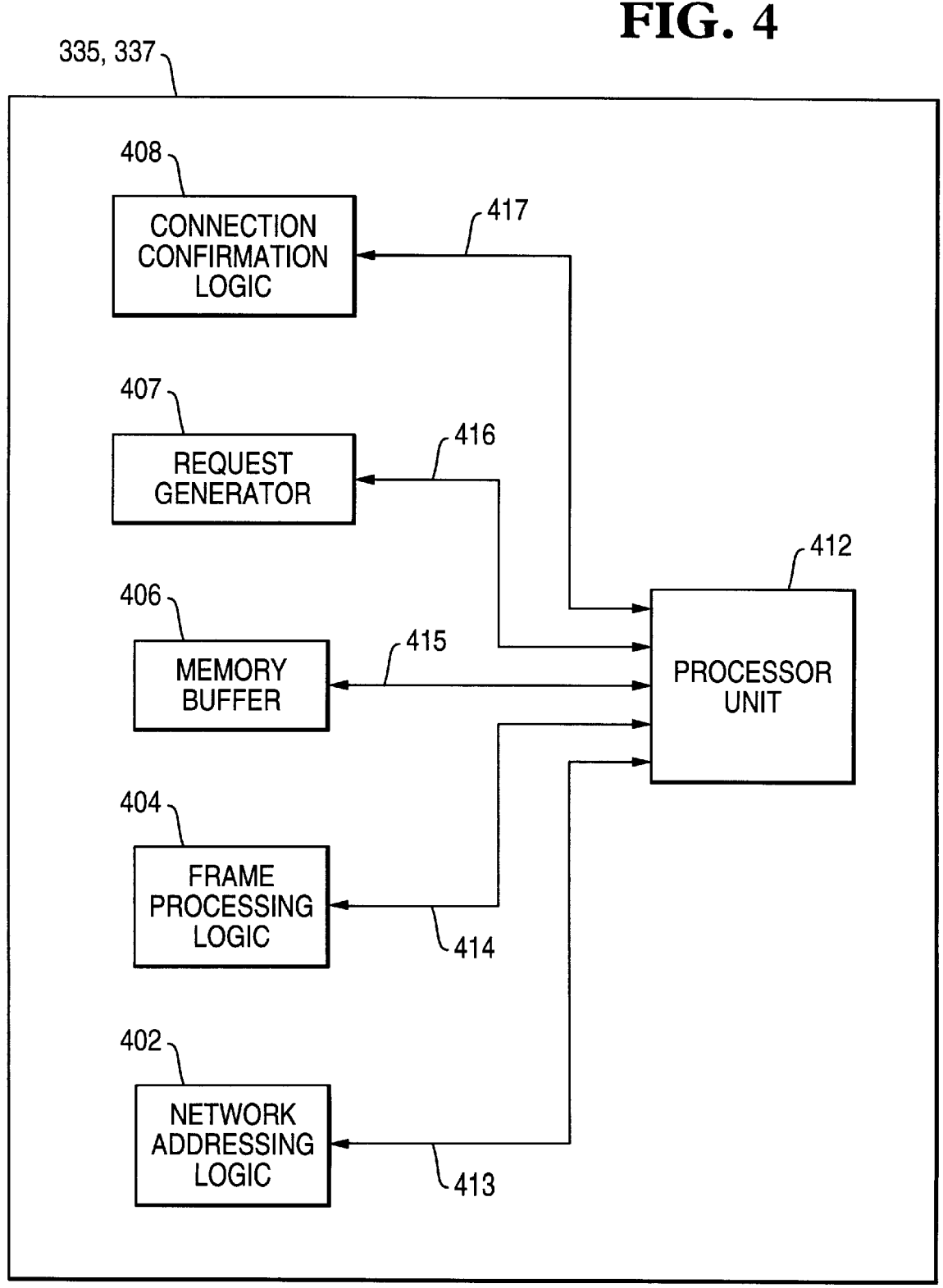
FIG. 4 depicts network connection logics shown in FIGS. 2B and 3C–3E in greater detail, in accordance with the present invention.

FIG. 4 depicts network connection logic 285 and 287 shown in FIG. 2B, and network connection logic 335 and 337 shown in FIGS. 3C-3E, in greater detail. The network connection logic includes network addressing logic 402, frame processing logic 404, memory buffer 406, request generator 407, connection confirmation logic 408, and processor unit 412. Network addressing logic 402, frame processing logic 404, memory buffer 406, request generator 407, and connection confirmation logic 408 are connected to processor unit 412 via lines 413–417 respectively.

Each of the docking stations and portable computers shown in FIGS. 2B and 3C–3E has a unique address assigned to it. Network addressing logic 402 contains the hardware and software to define and identify the address for the multiprocessor computer (shown in FIG. 2B), a docking station or a portable computer (shown in FIGS. 3C–3E), connected to the network.

Network 286 (or 342) transmits information frame-by-frame in accordance with specific network protocols. Frame processing logic 404 converts the incoming frames received from the network into the data and control signals that can be recognized by the multiprocessor computer, docking stations or portable computers. The frame processing logic also converts the outcomming signals into frames complying with the specific network protocols before sending them to the network.

Memory buffer 406 serves as a buffer for storing the incoming and outcomming data or control signals.

Request generator 407 at the side of the portable portion generates a connection request when the portable computer is connected to the network, and generates a disconnection request when the portable computer is being removed from the network. A specific implementation to generate the connection and disconnection requests is to deploy a mechanical structure having a locked position and a un-locked position on the connector between the network and the portable computer. When the mechanical structure is being moved to locked position, it will trigger the request generator to generate the connection signal; when the mechanical structure is being moved to the un-locked position, it will trigger the request generator to generate the disconnection request.

Connection confirmation logic 408 can confirm the connection and disconnection of a portable computer. When a portable computer is being connected to the network, it sends the connection request to the connection confirmation logic located at the side of the selected docking station (or at the side of the multiprocessor computer shown in FIG. 2B) via the network. Upon receiving the connection request, the connection confirmation logic at the side of the docking station (or at the side of the multiprocessor computer shown in FIG. 2B) confirms the connection.

When a portable computer is being disconnected from a docking station (or the multiprocessor computer shown in FIG. 2B), it sends the disconnection request to the connection confirmation logic at the side of the docking station (or the side of the multiprocessor computer shown in FIG. 2B via the network). Upon receiving the disconnection request, the connection confirmation logic at the side of the docking station (or at the side of the multiprocessor computer) confirms the disconnection.

In response to a connection request or a disconnection request, the connection confirmation logic at the side of the docking station (or at the side of the multiprocessor computer) sends a connection confirmation signal or a disconnection confirmation signal to parallel interconnecting control logic 269 in FIG. 2B, to parallel interconnecting control logic 368 in FIG. 3C, or to switching logic 390 in FIG. 3D.

In FIG. 2B, parallel interconnecting control logic 269 sets the processor modules 1–4 and portable computer 258 in parallel fashion to run the multiprocessor computer, in response to the connection confirmation signal; parallel interconnecting control logic 269 sets the processor modules 1–4 to run the multiprocessor without the portable computer, in response to the disconnection confirmation signal.

In FIG. 3C, parallel interconnecting logic 368 sets co-processor 362 and notebook computer 336 in parallel fashion to run docking station 308, in response to the connection confirmation signal; parallel interconnecting logic 368 sets co-processor 362 to run docking station 308 independently without notebook computer, in response to the disconnection confirmation signal.

In FIG. 3D, in responding to the connection confirmation signal, switching logic 390 can perform different operations, depending on whether the portable computer wants to perform diagnosis or conduct performance analysis for the docking station. If portable computer 336 does not want to perform diagnosis or conduct performance analysis, switching logic 390 connects notebook computer 336 to, and disconnects co-processor 382 from, control logic 386, in response to the connection confirmation signal. If the portable computer wants to perform diagnosis or conduct performance analysis, switching logic 390 relays control information and parameters from notebook computer 336 to co-processor 382, in response to the connection confirmation signal. Co-processor 382 operates docking station 308 according to the control information and parameters. Control logic 386 provides the control signal from co-processor 382 to interface circuit 313. Switching logic 390 also delivers the diagnostic information and performance analysis information to notebook computer 336.

In response to the disconnection confirmation signal, switching logic 390 in FIG. 3D connects co-processor 382 to, and disconnects notebook computer 336 from, the control logic.

Processor unit 412 can control the operation of network connection logic (285, 287, 335, or 337), and execute the instructions (or commands) stored in memory buffer 406. When portable computer 258 or 336 in FIGS. 2B and 3B–3E wants to control stationary portion, it sends instruction set to stationary portion via network 286 or 342. Under the control of processor 412, the network connection logic at the side of the stationary portion receives this instruction set and store it into a designated area in memory buffer 406. Processor 412 then executes the instruction set as if it acts for the portable computer 258 or 336 after the instruction set has been stored into memory buffer 406.

Figure 5A:
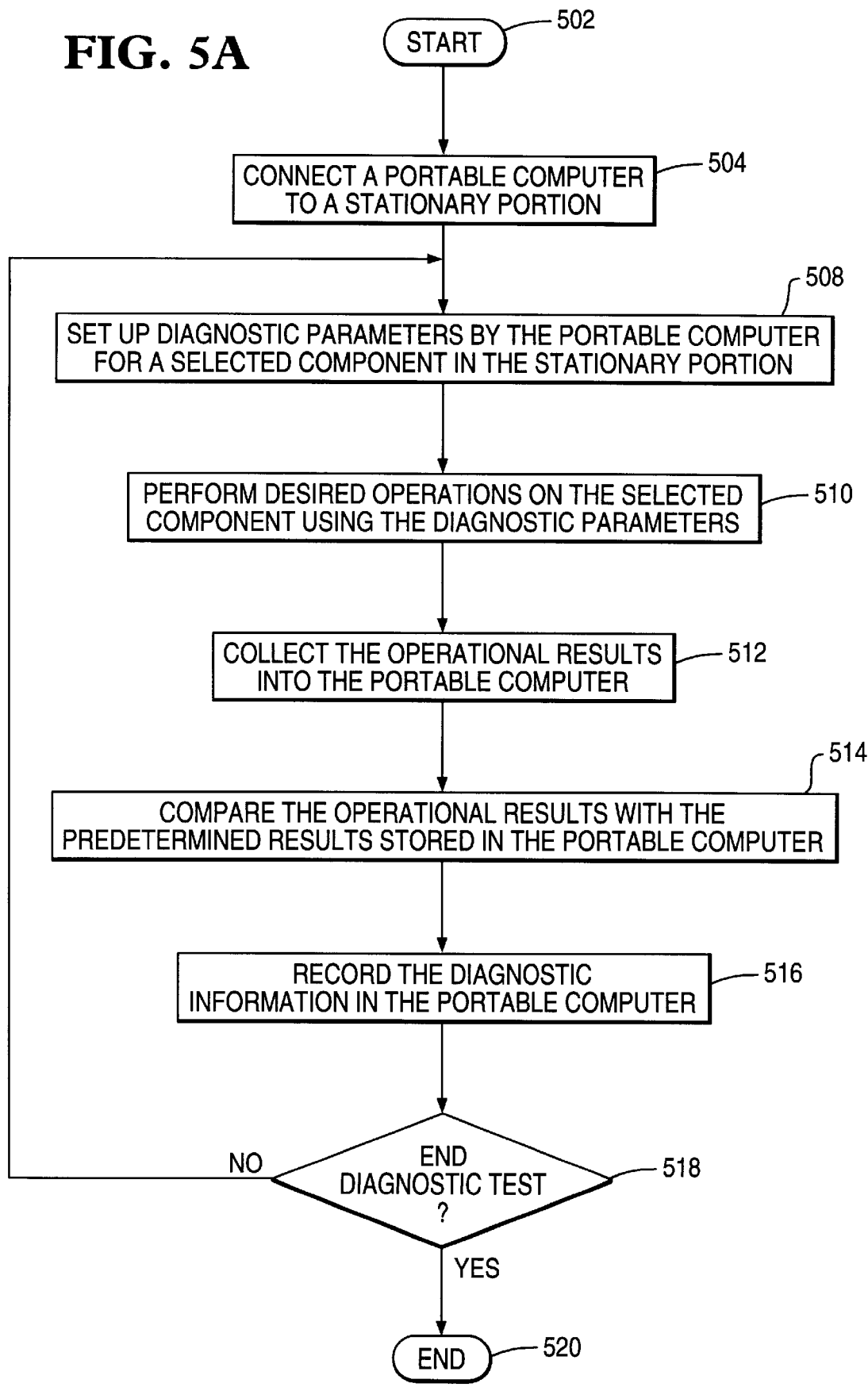
FIG. 5A depicts a flowchart showing a diagnostic operation for a stationary portion (or stationary portions), in accordance with the present invention.

FIG. 5A depicts a flowchart showing a diagnostic operation for a stationary portion (or several stationary portions) as shown in FIGS. 2A–2B and 3A–3E, in accordance with the present invention.

Step 504 connects a portable computer to a stationary portion.

In step 504, when the portable computer is connected to the stationary portion via network 286 or 342 (as shown in FIGS. 2B and 3C–3E), it sends a connection request to the stationary portion via the network. Connection confirmation logic 408 (as shown in FIG. 4) in the stationary portion confirms the connection between the stationary portion and the portable computer.

At step 508, the portable computer sets up diagnostic parameters for a selected component in the stationary portion. The selected component can be the interface circuit, one of the I/O devices, or any part of the control circuit. The content and format of the diagnostic parameters depends on the configuration and function of the selected component in the stationary portion. For example, the diagnostic parameters for a memory device can be the bit pattern, which will be written into and then read out from the memory device to check the operation of the memory device.

In step 508, when the portable computer is connected to the stationary portion via network 286 or 342 (as shown in FIGS. 2B and 3C–3E), it sends the diagnostic parameters and instruction set, which performs the diagnosis, to memory buffer 406 (as shown in FIG. 4) in the stationary portion via the network. As will be described bellow, processor unit 412 (as shown in FIG. 4) in the stationary portion executes the instruction set to carry out the diagnosis process, as if it acts for the portable computer.

Step 510 performs the desired operations on the selected component using the diagnostic parameters. In the present invention, the desired operation can be controlled and monitored by the portable computer. Depending on the embodiments shown in FIGS. 2A–2B and 3A–3E, step 510 can performs different operations.

Corresponding to the system shown in FIG. 2A, portable computer 258 can first perform the diagnosis for connection logic 248 or network connection logic 285, and for the basic functions of parallel interconnecting control logic 269: such as (1) the information path between the portable computer and any one of the processor modules 1–4, (2) the information path between any one of the processor modules 1–4, and (3) the information path between any pair of the four processor modules. The portable computer then sequentially assign desired operations to processor modules 1–4, so that each of the processor modules can be separately diagnosed. After system memory 274, parallel interconnecting control logic 269 and processor modules 1–4 have been preliminary diagnosed, the portable computer can assign desired operations that enable processor modules to work in parallel fashion, so that the overall function of control circuit 226 can be diagnosed. Finally, step 510 performs the desired operation to diagnose interface circuit 223 and I/O devices 1-n.

Corresponding to the system shown in FIG. 2B, the process in step 510 is similar as that for the system shown in FIG. 2A, except that processor unit 412 (as shown in FIG. 4) in the stationary portion executes the instruction set sent by portable computer 258 to carry out the process for the portable computer.

Corresponding to the system shown in FIG. 3A, portable computer 336 can first perform the diagnostics for connection logic 332, and for the basic functions of parallel interconnecting control logic 368: such as (1) the information path between portable computer 336 and co-processor 362, and (2) the information path between memory 374 and co-processor 362 or portable computer 336. The portable computer then assign desired operations to co-processor 362. The portable computer can then assign desired operations that enable co-processor 362 and the portable computer to work in parallel fashion, so that the overall function of control circuit 316 can be diagnosed. Finally, step 510 performs the desired operation to diagnose interface circuit 313 and I/O devices 1-n.

Corresponding to the system shown in FIG. 3B, portable computer 336 can first perform the diagnostics for connection logic 332 and switching logic 390. The portable computer can then instruct the switching logic to connect co-processor 382, so that the co-processor can control the operation of docking station 308 under the instructions from the portable computer. The portable computer can set up parameters and desired operation to test docking station 308 and monitor the operation results. After docking station 308 has been diagnosed, the portable computer will assign the desired operations to diagnose interface circuit 313 and I/O devices 1-n.

Corresponding to the system shown in FIG. 3C, the process in step 510 is similar as that for the system shown in FIG. 3A, except that processor unit 412 (as shown in FIG. 4) in the stationary portion executes the instruction set sent by portable computer 336 to carry out the process for the portable computer.

Corresponding to the system shown in FIG. 3D, the process in step 510 is similar as that for the system shown in FIG. 3B, except that processor unit 412 (as shown in FIG. 4) in the stationary portion executes the instruction set sent by portable computer 336 to carry out the process for the portable computer.

Corresponding to the system shown in FIG. 3E, portable computer 336 can perform the diagnostic process on stationary portions 1-n (or docking stations 1-n), via network 342. The portable computer can perform the diagnostics for network connection logic 335 and the other components of a stationary portion. By using a specific network address, the portable computer can select and perform the diagnostic process on one of stationary portions 1-n. For each stationary portion, the diagnostic process here is similar with that discussed in connection with FIG. 3A or 3B, except that processor unit 412 (as shown in FIG. 4) in the selected stationary portion executes the instruction set sent by portable computer 336 to carry out the process for the portable computer.

In FIG. 5A, step 512 collects the operational results into the portable computer.

When the portable computer is connected to the stationary portion via network 286 or 342 as shown in FIGS. 2B or 3C–3E, the operational results are first stored in memory buffer in the stationary portion and then transmitted to the portable computer via the network.

Since the portable computer sets up the diagnostic parameters according to the configuration and function of the selected components, the correct operational results are predetermined and preferably stored in the portable computer.

Step 514 compares the operational results with the predetermined results to generate diagnostic results. Such comparison can be performed in the portable computer.

Step 516 stores the diagnostic results in the portable computer.

Step 518 determines whether the diagnostic process should be continued.

If step 518 determines that the diagnostic process should be continued, the operation will be directed to step 508 to set up new diagnostic parameters for selecting another component in the system.

If step 518 determines that the diagnostic process should be terminated, the operation will end at step 520.

Figure 5B:
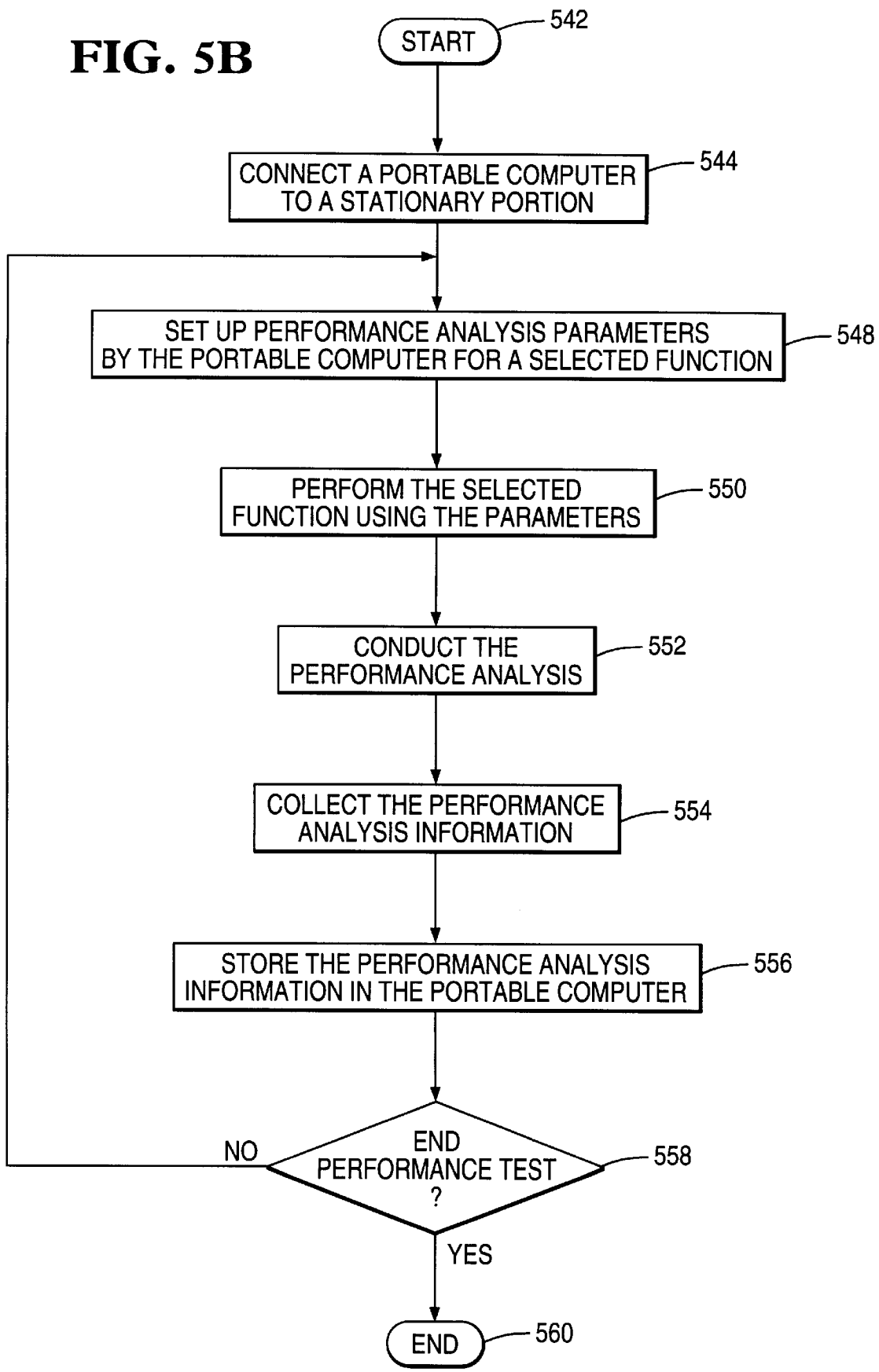
FIG. 5B depicts a flowchart showing a performance analyzing process for a stationary portion (or stationary portions), in accordance with the present invention.

FIG. 5B depicts a flowchart showing a performance analyzing process for a stationary portion or stationary portions shown in FIGS. 2A–2B and 3A–3E, in accordance with the present invention.

Step 544 connects a portable computer to a stationary portion.

In step 544, when the portable computer is connected to the stationary portion via network 286 or 342 (as shown in FIGS. 2B and 3C–3E), it sends a connection request to the stationary portion via the network. Connection confirmation logic 408 (as shown in FIG. 4) in the portable portion confirms the connection between the stationary portion and the portable computer.

At step 548, the portable computer sets up the performance analysis parameters for a selected function to be performed on the stationary portion.

In step 548, when the portable computer is connected to the stationary portion via network 286 or 342 (as shown in FIGS. 2B and 3C–3E), it sends the performance analysis parameters and instruction set, which carries out the analysis, to memory buffer 406 (as shown in FIG. 4) in the stationary portion via the network. As will be described bellow, processor unit 412 (as shown in FIG. 4) in the stationary portion executes the instruction set, as if it acts for the portable computer.

Step 550 performs the selected function using the parameters.

Step 552 conducts the performance analysis while the selected function is being performed.

When the portable computer is connected to the stationary portion via network 286 or 342 as shown in FIGS. 2B and 3C–3E, processor unit 412 in the stationary portion (shown in FIG. 4) executes the instruction set sent by the portable computer to carry out steps 550 and 552 for the portable computer.

Step 554 collects the performance analysis information.

When the portable computer is connected to the stationary portion via network 286 or 342 as shown in FIGS. 2B and 3C–3E, the performance analysis information is first stored in memory buffer 406 (shown in FIG. 4) in the stationary portion and then transmitted to the portable computer via the network.

Step 556 stores the performance analysis information into the portable computer.

Step 558 determines whether the performance analysis process should be continued.

If step 558 determines that the performance analysis process should be continued, the operation will be directed to step 548 to select another function to be performed on the system.

If step 558 determines that the performance analysis should be terminated, the operation will end at step 560.

The advantages of the present invention are as follows:
(1) a system's resource can be efficiently used when the portable portion is removed from the stationary portion of a system;
(2) the portable portion's processing capability is enhanced by the stationary portion when it is connected to the stationary portion of a system;
(3) a portable portion can be remotely connected to multiple stationary portions of a system; and
(4) diagnostic applications can be dynamically added to and executed in a multiprocessor environment by the cost effective application of portable technology to temporarily extend the processing capability of a system.

While the particular embodiments of the present invention have been described in detail, it should be understood that the invention may be implemented through alternative embodiments. Thus, the scope of the invention is not intended to be limited to the embodiments described above, but is to be defined by the appended claims.

What is claimed is:

1. A computer system comprising:
   (a) a stationary computer including a docking station having a network interface circuit couplable between said stationary computer and a network, said network interface circuit including:
      (i) a processor, and
      (ii) a network address logic for identifying a network address associated with said stationary computer; and
   (b) a portable computer including a network interface circuit coupled between said portable computer and the network;
   connection confirmation logic for sending connection and disconnection requests to the network when said portable computer is docked into said stationary computer and when said portable computer is undocked from said stationary computer;
   wherein said network interface circuit of said portable computer sends an instruction set to said network interface circuit of said stationary computer via the network based on the network address associated with said stationary computer when said portable computer is docked into said stationary computer;
   wherein said processor on said network interface circuit of said stationary computer executes the instruction set to perform diagnoses for said stationary computer when said portable computer is docked into said stationary computer.

2. The computer system of claim 1,
   wherein said processor on said network interface of said stationary computer executes the instruction set to measure performance of said stationary computer.

3. The computer system of claim 1:
   wherein aid network interface circuit of said stationary computer collects a result of the diagnoses from said stationary computer, and sends the result to said portable computer via the network.

4. A computer system comprising:
   a plurality of stationary computers, with each one of said stationary computers including a docking station having a network interface circuit coupled between said one stationary computer and a network, said network interface circuit including:
      (i) a processor,
      (ii) a memory device,
      (iii) a network addressing logic for identifying a network address associated with said one stationary computer; and
   a portable computer;
   wherein said portable computer sends an instruction set to said one stationary computer identified by the network addresses associated with said one stationary computer, said network interface circuit on said one stationary computer identified by the network address associated with said one stationary computer stores the instruction set into said memory device on said network interface circuit of said one stationary computer when said sortable computer is docked into said stationary computer;
   connection confirmation logic for sending connection and disconnection requests to the network when said portable computer is docked into said stationary computer and when said portable computer is undocked from station stationary computer;
   wherein said processor on said network interface circuit of said one stationary computer executes the instruction set to perform diagnoses to said one stationary computer identified by the network address associated with said one stationary computer when said portable computer is docked into said stationary computer;
   wherein said network interface circuit on said one stationary computer collects a result of the diagnoses and sends the result to said portable computer via the network when said portable computer is docked into said stationary computer.

5. A computer system comprising:
   a plurality of stationary computers, with each one of said stationary computers including a docking station having a network interface circuit coupled between said one stationary computer and a network, said network interface circuit including:
(i) a processor,
(ii) a memory device, and
(iii) a network addressing logic for identifying a network address associated with said one stationary computer; and a portable computer;

wherein said portable computer sends an instruction set to said one stationary computer identified by the network address associated with said one stationary computer, said network interface circuit on said one stationary computer identified by the network address associated with said one stationary computer stores the instruction set into said memory device on said network interface circuit of said one stationary computer when said portable computer is docked into said stationary computer;

connection confirmation logic for sending connection and disconnection requests to the network when said portable computer is docked into said stationary computer and when said portable computer is undocked from said stationary computer;

wherein said processor on said network interface circuit of said one stationary computer executes the instruction set to measure performance of said one stationary computer identified by the network address associated with said stationary computer when said portable computer is docked into said stationary computer;

wherein said network interface circuit on said one stationary computer collects a result of the measured performance and performs a diagnoses and sends the result to said portable computer via the network when said portable computer is docked into said stationary computer.

6. A method in using with a computer system having a stationary computer and a portable computer, the stationary computer having a network interface, coupled between the stationary computer and a network, including:
(i) a processor,
(ii) a network address logic for identifying a network address associated with the first computer, and
(iii) a memory device, the method comprising the steps of:

(a) docking portable computer into the stationary computer;

(b) at the portable computer, sending an instruction set to the stationary computer via the network;

(c) at the stationary computer, storing said instruction set into the memory device on said network interface circuit of the stationary computer; and (d) at the stationary computer, executing said instruction set by the processor to perform diagnoses on the stationary computer.

7. The method of claim 6, further comprising the step of:
(e) at the stationary computer, sending a result of the diagnoses to the second computer.

* * * * *